United States Patent [19]

Tronzo

[11] 3,808,606
[45] May 7, 1974

[54] BONE IMPLANT WITH POROUS EXTERIOR SURFACE

[76] Inventor: Raymond G. Tronzo, 133 S. 36th St., Philadelphia, Pa. 19104

[22] Filed: Mar. 19, 1973

[21] Appl. No.: 342,461

Related U.S. Application Data

[63] Continuation-in-part of Ser. No. 228,052, Feb. 22, 1972, abandoned.

[52] U.S. Cl................. 3/1, 128/92 C, 128/92 CA, 32/10 A
[51] Int. Cl........................ A61f 1/24, A61c 13/00
[58] Field of Search........ 3/1, 13; 128/92 C, 92 CA, 128/92 BA, 92 R, 92 G, 92 F, 334 R; 32/10 A

[56] References Cited
UNITED STATES PATENTS

| | | | |
|---|---|---|---|
| 2,910,978 | 11/1959 | Urist | 128/92 C |
| 3,076,453 | 2/1963 | Tronzo | 128/92 BA |
| 3,314,420 | 4/1967 | Smith et al. | 128/92 C |
| 3,465,441 | 9/1969 | Linkow | 32/10 A |
| 3,466,670 | 9/1969 | Christiansen | 3/1 |
| 3,605,123 | 9/1971 | Hahn | 3/1 |

OTHER PUBLICATIONS

"Teflon Hip Prostheses in Dogs" by J. D. Leidholt et al., The Journal of Bone & Joint Surgery, Vol. 47A, No. 7, Oct. 1965, pp. 1,414–1420.
"Sintered Fiber Metal Composites as a Basis for Attachment of Implants to Bone" by J. Galante et al., The Journal of Bone & Joints Surgery, Vol. 53-A, No. 1, Jan. 1971, pp. 101–114.
"Surgical Implants-The Role of Surface Porosity in Fixation to Bone and Acrylic" by R. P. Welsh et al., The Journal of Bones & Joint Surgery, Vol. 53-A, No. 5, July, 1971, pp. 963–977.

Primary Examiner—Richard A. Gaudet
Assistant Examiner—Ronald L. Frinks
Attorney, Agent, or Firm—Jackson, Jackson & Chovanes

[57] ABSTRACT

A bone implant for vertebrates, including humans and animals in veterinary surgery such as hip prosthesis or a bone implant into the jaw in dental surgery, having a solid surface adapted to be in contact with the growing bone, said surfaces having at the outside at least a depth of 100 microns and preferably of ⅛ inch of 20 to 50%, preferably 30 to 40%, and most desirably about 33% of the pore area. The pores are divided between small, intermediate and large pores and the area of each is between 20 and 40% of the total pore area, preferably 30 to 36% and most desirably about 33%. The small pores range in size between 50 and 200 microns in diameter, preferably 75 to 100 microns and most desirably about 100 microns. The intermediate pores range in size from about 200 to 800 microns. The large pores range in size from above 800 to 3,500 microns.

11 Claims, 18 Drawing Figures

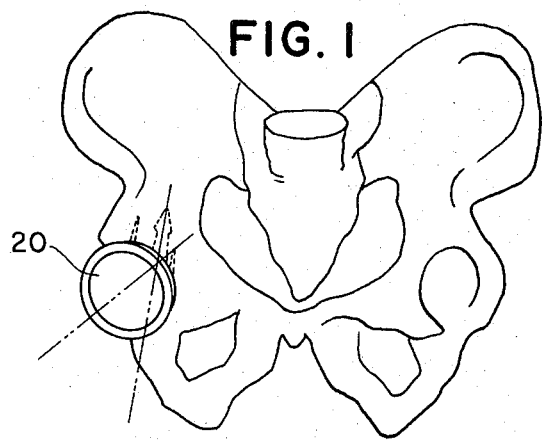
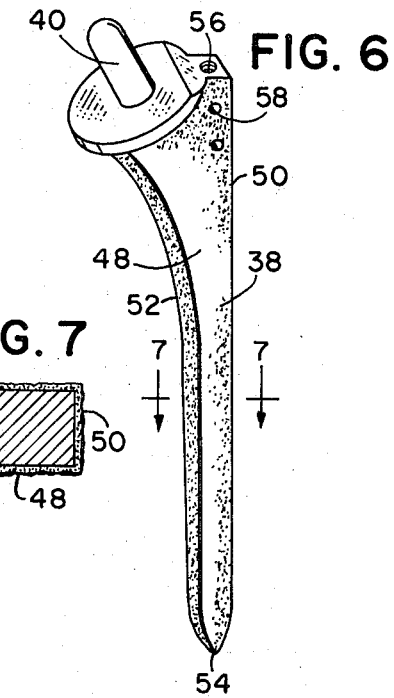
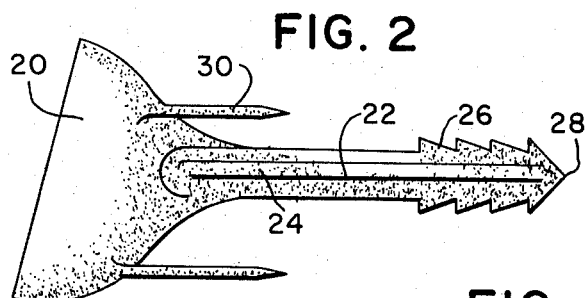
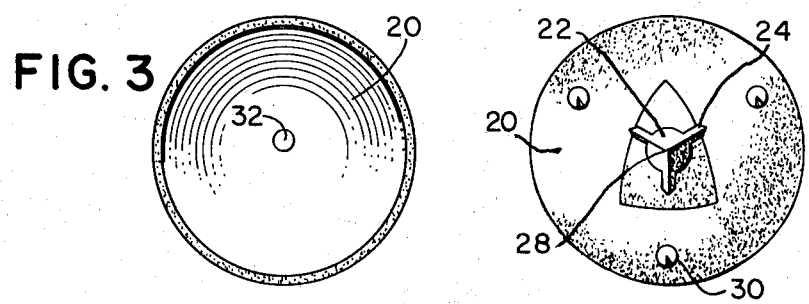
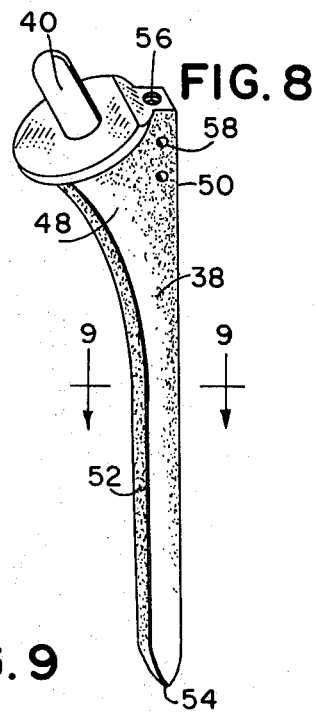
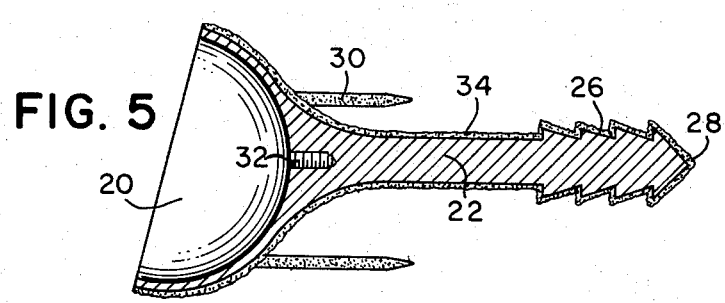

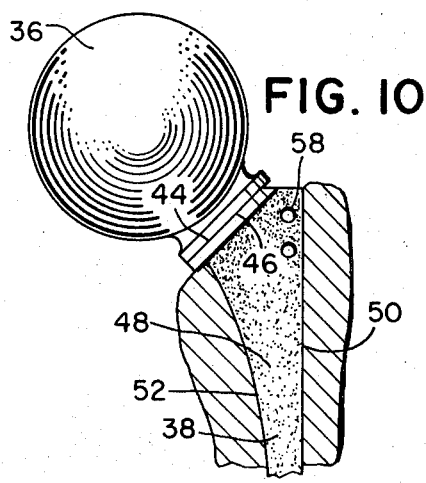
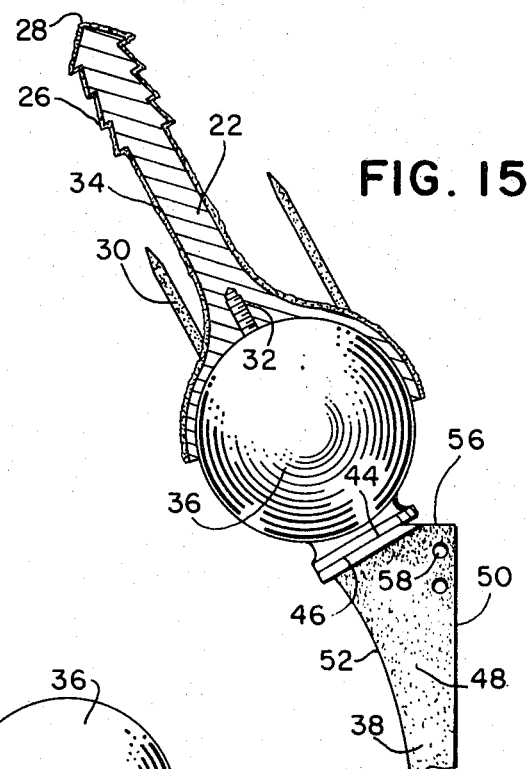
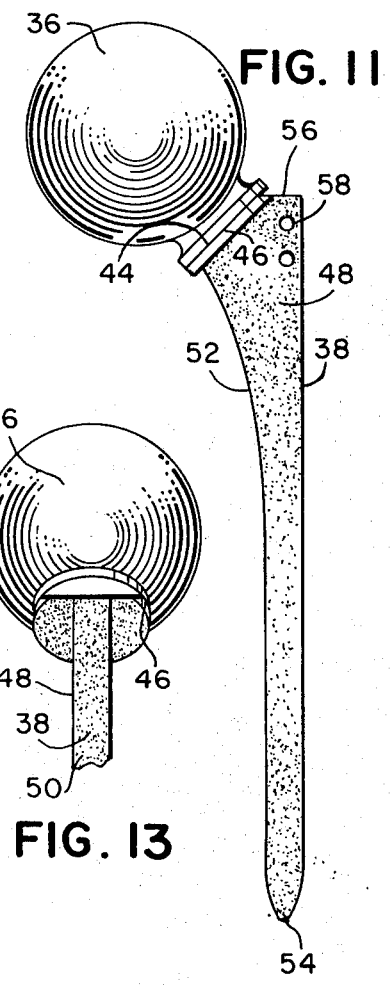
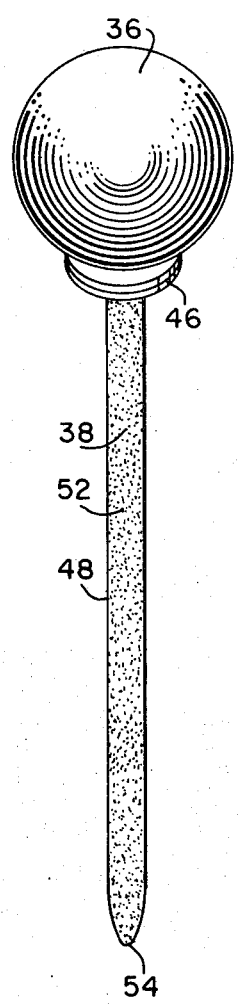
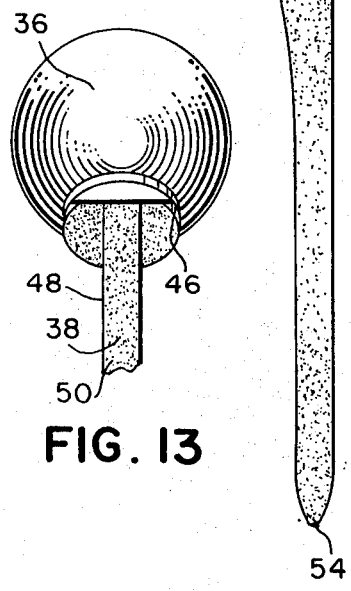
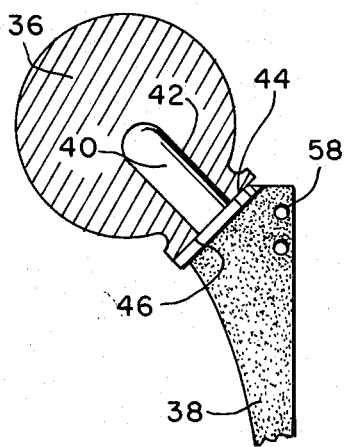

BONE IMPLANT WITH POROUS EXTERIOR SURFACE

This is a continuation-in-part of my application for Bone Implant with Porous Exterior Surface, Ser. No. 228,052, filed Feb. 22, 1972 and now abandoned.

The present invention relates to bone implants in mammals such as human beings and the higher animals in veterinary medicine.

A purpose of the present invention is to anchor bone implants such as bone contacting parts of total hip prostheses and bone contacting parts of tooth implants in dental surgery in such a way that the bone will have the maximum chance to integrate firmly with the implant, and allowance will be made for the stages of bone development to anchor with the implant.

A further purpose is to provide an adequate number of small pores on the surface and extending beneath the surface to permit rapid bone growth in contact with the implant, but by the presence of intermediate pores and large pores of adequate size and frequency, prevent early failure and stress fracture of the bone intruding into the small pores.

A further purpose is to prevent impairment of contact of the implant by bone growing into large and intermediate pores by anchoring such bone firmly during the initial growing period by bone growing into small pores, avoiding conditions of abrasion and rocking of the bone growing into the large and intermediate pores which might impair subsequent anchorage.

A further purpose is to have a solid surface of the implant in contact with the bone having 20 to 50% of the surface at the outside, preferably 30 to 40% of the surface and most desirably about 33% of the surface consisting of pores freely connecting on at least a depth of 100 microns, and preferably at least ⅛ inch so that the bond can firmly adhere to them.

A further purpose is to divide the pore surface into 20 to 40% of the surface area, preferably 30 to 36% and most desirably about 33% each of small, intermediate and large pores, the small pores being of 50 to 200 microns diameter at the outside, preferably 75 to 100 microns and most desirably about 100 microns, the intermediate pores being about 200 microns and not exceeding 800 microns in diameter at the outside and the large pores having a size larger than 800 microns and not exceeding 3,500 microns in diameter at the outside.

Further purposes appear in the specification and in the claims.

In the prior an effort has been made to establish implants having fine pores of the order of 30 to 200 microns, Hahn U.S. Pat. No. 3,605,123, granted Sept. 20, 1971 for BONE IMPLANT. In initial stages these implants adhere well to the bone but as service continues more and more failure occurs of the adhering bone portions, until many of the implants come loose. Welsh, Pilliar and MacNab, Vol. 53-A, No. 5, July, 1971 of The Journal of Bone and Joint Surgery, page 963 and following having described implants into a powder metallurgical structure of Vitallium having pores from 50 to 100 microns in diameter with some success. Jardon, U.S. Pat. No. 2,688,139, granted Sept. 7, 1954 for ANATOMICAL REPLACEMENT MEANS describes an anchorage for an artificial eye of porous material which may be of tantalum or columbium, without giving details as to pore size.

I have discovered that in making bone implants the presence of rather large pores alone is not sufficient because the bond anchorages rock and fret and abrade during the period of bond growth and are not effective. On the other hand, the presence of small pores alone, while very effective to establish contact shortly after the implant is made and during the initial bone growing period are not satisfactory because the bone intrusions into these small pores, though they achieve firmness rather early in the growing period, are not adequate to maintain strength and at a later period fail and shear. Thus in summary, the small pores aid in obtaining early and effective anchorage and immobilization between the implant and the bone which permits the large and intermediate pores to be filled with properly grown strong bone growth, after which the major strength component between the bone and the implant is contributed by the large and intermediate pores while the small pores continue to be of assistance. If one were to use large and intermediate pores alone without small pores, the danger is that they would not become filled with a strong bone growth. If one were to use small pores alone, the danger is that the bone in them would fail through inadequare strength.

In my application Ser. No. 228,052 aforesaid, I referred to the necessity of making the porous part at least ⅛ inch deep. While there is an advantage in having the porous part at least ⅛ inch deep, I have found by experimentation that the porous part is adequate though not ideal if it has a depth of 100 microns, and there is an advantage in having it at least 1/16 inch thick and a further advantage in having it ⅛ inch thick.

I have chosen to illustrate a few only of the embodiments in which my invention appears, choosing the forms shown from the standpoints of convenience in illustration, satisfactory operation and clear demonstration of the principles involved.

FIGS. 1 to 15 relate to a total hip prosthesis implant; FIGS. 16 and 17 relate to tooth implants and FIG. 18 shows a photomicrograph of experimental work on dogs illustrating an implant.

FIG. 1 shows a prosthethic hip socket implant of the invention inserted in the acetabulum.

FIG. 2 is a side view of one embodiment of the prosthetic hip socket of the invention.

FIG. 3 is a front view of the prosthetic hip socket.

FIG. 4 is a rear view of the prosthetic hip socket.

FIG. 5 is a longitudinal section of prosthetic hip socket through the axis of the major nail.

FIG. 6 is a perspective of a femur nail implant supporting a trunion for mounting the ball.

FIG. 7 is a section on the line 7—7 of FIG. 6.

FIG. 8 is a view corresponding to FIG. 6 and showing a variation.

FIG. 9 is a section on the line 9—9 of FIG. 8.

FIG. 10 is a fragmentary side view in section through the bone showing the prosthetic hip nail implant of the invention mounting a ball and inserted in the bone.

FIG. 11 is a side elevation of the ball and the femur nail of the invention.

FIG. 12 is a front elevation in the femur nail of the invention.

FIG. 13 is a fragmentary rear elevation of the ball and the femur nail of the invention.

FIG. 14 is a fragmentary section through the ball on the axis of the trunion.

FIG. 15 is a fragmentary sectional view through the axis of its major nail of the socket of the invention assembled with a ball and a femur nail.

Figure 16:
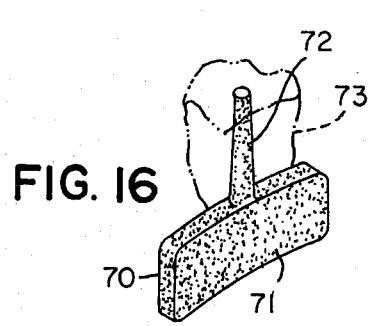
FIG. 16 is a perspective view of a tooth implant according to the invention.

In the present invention a bone implant anchors in the bone by bone growth without the use of cement which presents the problem of toxicity or formation of a weak membrane between the implant and the bone.

One requirement of the implant which is to contact the bone is that it must be of a material which is non-toxic to the human body, which does not deteriorate by corrosion and which does not encourage symptoms of rejection by the human.

One surface which is very effective is a porous surface of metal which may be stainless steel, for example having 8% of nickel and 18% of chromium or for example having 16% chromium.

The implant may to advantage be made of Vitallium, a cobalt chromium molybdenum alloy of which one example is the following:

| | |
|---|---|
| cobalt | 62½% |
| chromium | 31.2% |
| molybdenum | 5.1% |
| manganese | 0.5% |
| silicon | 0.3% |
| carbon | 0.4% |

The Vitallium alloys have the following range:

| | |
|---|---|
| cobalt | 62.0–65.0% |
| chromium | 27.0–35.0% |
| molybdenum | 5.0–5.6% |
| manganese | 0–0.6% |
| iron | 0–1% |
| nickel | 0–2% |
| silicon | 0–0.6% |
| carbon | 0–0.4% |

The powder metallurgy material may also be of titanium or titantium alloy.

The surface of the implant may to advantage be of powder which is placed and then sintered for example in hydrogen at an elevated temperature, or it may be a layer of suitable pore size on the surface of a solid metal substrate provided with free pores into which the bone can intrude at least 100 microns thick, preferably at least 1/16 inch thick, and most desirably at least ⅛ inch thick. This is important because in my experiments thinner layers have had a tendency to separate from the bone. This coating may be achieved by metallizing techniques, as described in Welding Handbook, Third Edition, in which the metal powder at a high enough temperature to melt or incipiently melt is projected on the surface of a substrate or a steel or the like by a torch or arc. This coating must not be wholly dense as explained in detail herein. While there is an advantage in having it applied to a coating of metal, it is permissible to apply it to a coating of ceramic or of plastic.

It is important in the invention that the pores at the surface cover a substantial part of the surface, at least 20 to 50%, preferably 30 to 40%, and most desirably about 33%.

The pores in size must be divided between small, intermediate and large pores, and at the surface from 20 to 40% of the pore area, preferably from 30 to 36% and most desirably 33% must be in each pore diameter (large, intermediate and small). For the purposes of this invention small pores constitute pores having diameters at the surface of between 50 and 200 microns, preferably 75 and 125 microns and most desirably about 100 microns. Pores smaller than this are largely ineffective.

The intermediate pores are in the range from 200 to 800 microns.

The large pores are larger than 800 microns and not larger than 3,500 microns.

For purposes of the present invention I describe in detail a total hip prosthesis in which the implant of the invention is used.

The socket 20 consists of a hemispherical hollow body which is adapted to be mounted in the acetabulum in line with the former hip socket. From the back of the socket and suitably integral protrudes a major nail 11 which has a continuous and suitably uniform cross section but preferably has three flutes 24 equally circumferentially placed which terminate in shark's teeth 26 and end in a point 28. All of the exposed outside of the socket and nail preferably consists of a combination of a porous material such as metal having pores as described. The socket is not in straight alignment with the nail wholly symmetrical but is offset or inclined toward the outside of the body in a sidewise direction about 20°. This is more consonant with the pull of the muscular structure to hold the ball in place. At the back of the socket and protruding from it there are preferably three evenly placed circumferentially distributed parallel spikes 30. The spikes are preferably of the order of one-third to one-half the length of the nail 22.

In line with the axis of the nail and in the socket is a threaded bore 32 in which can be fitted a threaded driving end of an inserting tool, the inserting tool having a ball preferably of plastic engaging the socket during insertion. This ball has a cushioning effect on driving, tending to distribute the impact and is preferably made of high density polyethylene plastic.

The entire outside of the nail 22 and the socket 20 is coated with a porous layer 34 best seen in FIG. 5. This is preferably an adhering powder metallurgical sintered compact, having the pores and the pore distribution above referred to. The bone will grow into these pores and integrate with the socket and the nail.

The natural ball in a vertebrate's hip joint at the end of the femur is removed by operative procedure and a prosthetic ball 36, fitting the socket, is supported on the femur nail 38. The femur nail 38 has a trunion 40 in the preferred embodiment although it optionally may be restrained against rotation. This trunion 40 is offset from the axis of the femur nail preferably at an angle of about 145° and the prosthetic ball 36 has a central opening 42 which engages and fits the trunion, allowing the ball in the preferred embodiment to turn. The ball also has a circular face 44 which cooperates with the trunion face 46 of the femur nail.

The ball may be made of stainless steel or an alloy such as Vitallium but it is preferably made of a plastic such as a high density polyethylene which will give good wear with the socket. The bearing surfaces on the femur nail are smooth and are preferably plated as with chromium or nickel.

The femur nail has preferably parallel side surface 48, a preferably straight end surface 50 which is parallel with the axis, and a gradually diminishing end surface 52 toward a point 54. The femur nail may have a threaded socket 56 by which it can be driven by inserting the threaded end of a driving tool and may have openings 58 for insertion of a tool by which it can be additionally manipulated. The femur nail on its surface of contact with the bone as best seen in FIG. 7 in one embodiment has a sufficiently thick adherent porous layer of powder metallurgical sintered particles with proper pore distribution as referred to, as shown at 34 in order that the bone may integrate with the implant.

In some cases it is preferably to manufacture both the socket and femur nail of porous sintered powder metallurgical material having proper pore size and pore distribution as referred to and adequately resistant to disintegration, as shown in FIGS. 8 and 9 (for the femur nail). Of course, the porous material may be manufactured by other methods than by sintered powder metallurgy techniques. In the case of a trunion and a socket produced by powder metallurgy techniques, it is preferable to make a smooth surface, for example by chromium plating.

Figure 17:
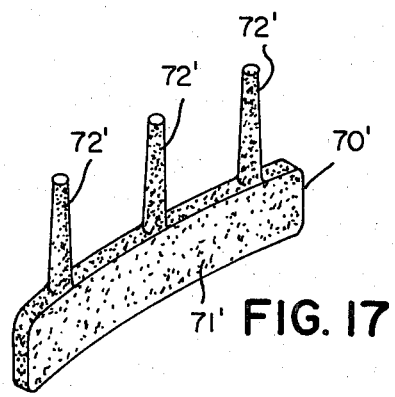
FIG. 17 is a perspective view of another implant mounting three teeth.

In FIG. 16 a jaw bone implant is shown for support of replacement teeth. The implant consists of an anchorage 70 which has a bone implant portion 71 having voids and void distribution as described and preferably formed of sintered powder metallurgical particles such as Vitallium or stainless steel as described, entirely through the implant portion and which has an upstanding column portion 72 on which a ceramic tooth 73 is mounted in surrounding relation. The invention also lends itself to production of a multiple tooth implant 70', FIG. 17, having a bone implant portion 71' consisting of a suitable material such as one of the metals described having the voids and the void distribution described and supporting column portions 72' upstanding each of which provides an anchorage for a tooth as shown.

Figure 18:
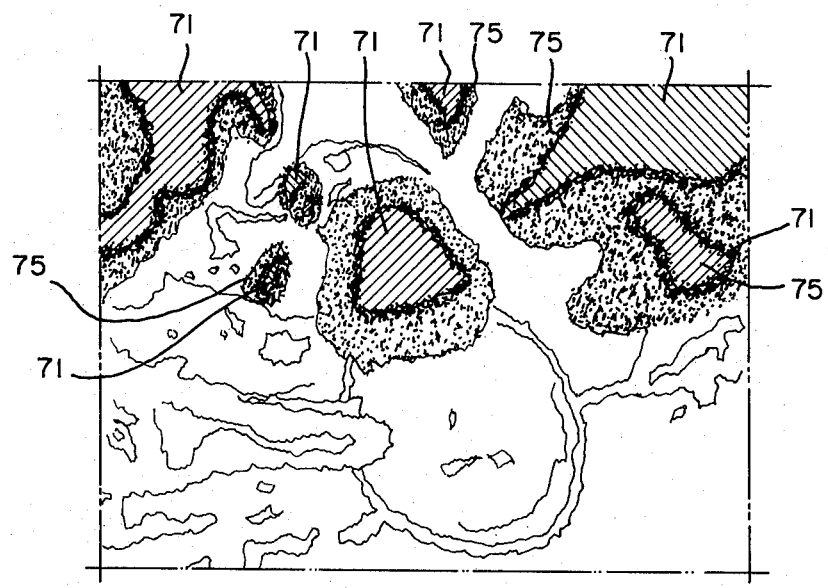
FIG. 18 is a photomicrograph made in a metallurgical microscope showing a section of the implant of the invention at 100 diameters after bone has grown into one of the large pores. The view was taken of a dog's hip.

FIG. 18 is a photomicrograph under a metallurgical microscope at a 100 diameter of a bone implant which has been given time to anchor in a dog's femur. The metallic implant portion 71 is shown having a large void as illustrated in which bone 75 has grown. The structure also has intermediate and small voids as described, not shown in this particular view, which assure the effectiveness of the large voids.

In installing the implant whether it be a hip prosthesis or a tooth implant or other implant, an incision must be made and in the case of the hip joint, the natural hip ball and socket must be removed, and the prosthesis inserted by well known techniques. A pilot hole must be drilled in the femur for the hip nail and a corresponding pilot hole in the acetabulum for the hip socket. Both nails should be inserted at places in the bone which the surgeon recognizes as places where the bone will grow rapidly. The ball is inserted and the muscles draw the hip together when by normal procedure the incision may be closed. In the case of a tooth implant the oral surgeon must remove the old tooth or teeth, if necessary making an incision in the gum as necessary, and drilling into the bone if necessary for insertion of the implant, additionally driving it into place as this is required.

The bone will transgress into the porous surface of the implant and intrude first into the small pores, achieving some anchorage and then later into the intermediate and large pores, tending to anchor the structure more firmly.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by letters Patent is:

1. A vertebrate bone implant having solid surfaces adapted to be held in contact with growing bone, said surfaces having at the outside from 20 to 50% pore area, at least 100 microns in depth, of pores between 20 and 40% of the surface pore area being small pores between 50 and 200 microns diameter, between 20 and 40% of the surface pore area being intermediate pores between about 200 and 800 microns in diameter and between 20 and 40% of the surface pore area being large pores exceeding 800 and not exceeding 3,500 microns in diameter.

2. A bone implant of claim 1, in which the porous layer is 1/16 inch thick.

3. A bone implant of claim 2, in which the porous layer is at least ⅛ inch in depth.

4. A bone implant of claim 1, in which from 30 to 40% of the outside surface is pore area.

5. A bone implant of claim 1, in which about 33% of the surface is pore area.

6. A bone implant of claim 4, in which between 30 and 36% of the pore surface is small pores, between 30 and 36% of the surface is intermediate pores and between 30 and 36% of the surface is large pores.

7. A bone implant of claim 5, in which about 33% of the surface is small pores, about 33% of the surface is intermediate pores and about 33% of the surface is large pores.

8. A bone implant of claim 2, in which about 33% of the surface is pore area.

9. A bone implant of claim 1, in which about 30 to 36% of the outside pore area is small pores, about 30 to 36% of the outside pore area is intermediate pores and about 30 to 36% of the outside pore area is large pores.

10. A bone implant of claim 1, in which the surfaces adapted to be in contact with the growing bone are of a stainless steel alloy.

11. A bone implant of claim 1, in which the surfaces adapted to be in contact with the growing bone are a cobalt chromium molybdenum alloy.

* * * * *